United States Patent
Karunakaran et al.

(10) Patent No.: US 11,489,670 B2
(45) Date of Patent: Nov. 1, 2022

(54) SYSTEM AND METHOD FOR TRANSMITTING TIME INFORMATION AND QUANTUM STATES ON AN OPTICAL MEDIUM

(71) Applicant: QuNu Labs Pvt Ltd, Bengaluru (IN)

(72) Inventors: M T Karunakaran, Bengaluru (IN); Ganesh Yadav, Bengaluru (IN); Anindita Banerjee, Bengaluru (IN); Krishnan Rajesh Kumar, Bengaluru (IN)

(73) Assignee: QuNu Labs Pvt Ltd

( * ) Notice: Subject to any disclaimer, the term of this patent is extended or adjusted under 35 U.S.C. 154(b) by 0 days.

(21) Appl. No.: 16/688,999

(22) Filed: Nov. 19, 2019

(65) Prior Publication Data

US 2021/0152355 A1    May 20, 2021

(51) Int. Cl.
*H04B 10/70*     (2013.01)
*H04L 9/12*      (2006.01)
*H04B 10/50*     (2013.01)
*H04L 9/08*      (2006.01)
*H04B 10/11*     (2013.01)
*H04B 10/25*     (2013.01)

(52) U.S. Cl.
CPC ............... *H04L 9/12* (2013.01); *H04B 10/11* (2013.01); *H04B 10/25891* (2020.05); *H04B 10/50* (2013.01); *H04B 10/70* (2013.01); *H04L 9/0852* (2013.01)

(58) Field of Classification Search
CPC ..... H04L 9/12; H04B 10/11; H04B 10/25891; H04B 10/50; H04B 10/70
See application file for complete search history.

(56) References Cited

U.S. PATENT DOCUMENTS 5,675,648 A * 10/1997 Townsend ............. H04L 9/0858
                                                    380/256
8,755,687 B2    6/2014 Dynes et al.
(Continued)

OTHER PUBLICATIONS

Akihiro Tanaka, Mikio Fujiwara, Sae Woo Nam, Ultra-fast quantum key distribution over a 97 km installed telecom fiber with wavelength division multiplexing clock synchronization (https://www.researchgate.net/publication/51422127_Ultra_fast_quantum_key_distribution_over_a_97_km_installed_telecom_fiber_with_wavelength_division_multiplexing_clock_synchronization last viewed on Nov. 19, 2019 at 15:58).

*Primary Examiner* — Nathan M Cors
(74) *Attorney, Agent, or Firm* — Jason C. Cameron

(57) ABSTRACT

A method for transmitting time information and quantum states on an optical medium is disclosed. The method includes transmitting information comprising a timing information and quantum states over a single wavelength on an optical medium. The method also includes receiving each transmitted information sequentially in the corresponding plurality of time slots at a receiver. The method also includes comparing each timing information received in the corresponding plurality of timeslots with timing information of a preceding hold over time slot of the plurality of time slots. The method also includes determining a time drift encountered at the receiver based on a compared result. The method also includes synchronising phase and frequency of the plurality of transmitted packets of the information based on minimization of determined time drift.

6 Claims, 2 Drawing Sheets

(56) References Cited

U.S. PATENT DOCUMENTS

2005/0180575 A1* 8/2005 Maeda ............... H04L 7/0075
380/278
2007/0092083 A1   4/2007 Young et al.
2008/0137858 A1* 6/2008 Gelfond ............. H04L 9/0852
380/256
2016/0337032 A1* 11/2016 Johnson .............. H04J 14/08

* cited by examiner

SYSTEM AND METHOD FOR TRANSMITTING TIME INFORMATION AND QUANTUM STATES ON AN OPTICAL MEDIUM

BACKGROUND

Embodiments of the present disclosure relate to transporting time information and quantum states over a single wavelength on an optical medium.

This invention is enabling a new feature in applications which transport quantum state information between two nodes. The present method involves transmission of quantum states from one node to another and decoding the information between them by using timing information sent separately from the medium used for quantum state transfer. Hence, such methods lead to high operational cost due to requirement of multiple optical mediums. One of the specific applications is quantum key distribution systems like BB84, DPS, COW, RRDPS, et cetera.

Hence, there is a need for an improved system and a method for transmitting time information and quantum states on an optical medium in order to address the aforementioned issue.

BRIEF DESCRIPTION

In accordance with an embodiment of the present disclosure, a system for transmitting time information and quantum states on an optical medium is disclosed. The system includes a first time-synchronisation unit coupled to a transmitter. The first time-synchronisation unit is configured to transmit each information in a corresponding plurality of time slots through an optical channel, wherein each information includes timing information and a plurality of quantum states. The system also includes a second time-synchronisation unit operatively coupled to a receiver through the optical channel. The second time-synchronisation unit is configured to receive each transmitted information sequentially in the corresponding plurality of time slots. The second time-synchronisation unit is also configured to compare each timing information received in the corresponding plurality of time slots with timing information of a preceding hold over time-slot of the plurality of time slots. The second time-synchronisation unit is also configured to determine a time drift encountered at the receiver based on a compared result. The second time-synchronisation unit is also configured to synchronise phase and frequency of the information based on minimization of determined time drift.

In accordance with another embodiment of the present disclosure, a method for transmitting time information and quantum states on an optical medium is disclosed. The method includes transmitting each information in a corresponding plurality of timeslots through an optical channel by a first time-synchronisation unit coupled to a transmitter, wherein each information includes timing information and a plurality of quantum states. The method also includes receiving each transmitted information sequentially in the corresponding plurality of time slots at a receiver. The method also includes comparing each timing information received in the corresponding plurality of timeslots with timing information of a preceding hold over time slot of the plurality of time slots. The method also includes determining a time drift encountered at the receiver based on a compared result. The method also includes synchronising phase and frequency of the plurality of transmitted packets of the information based on minimization of determined time drift.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
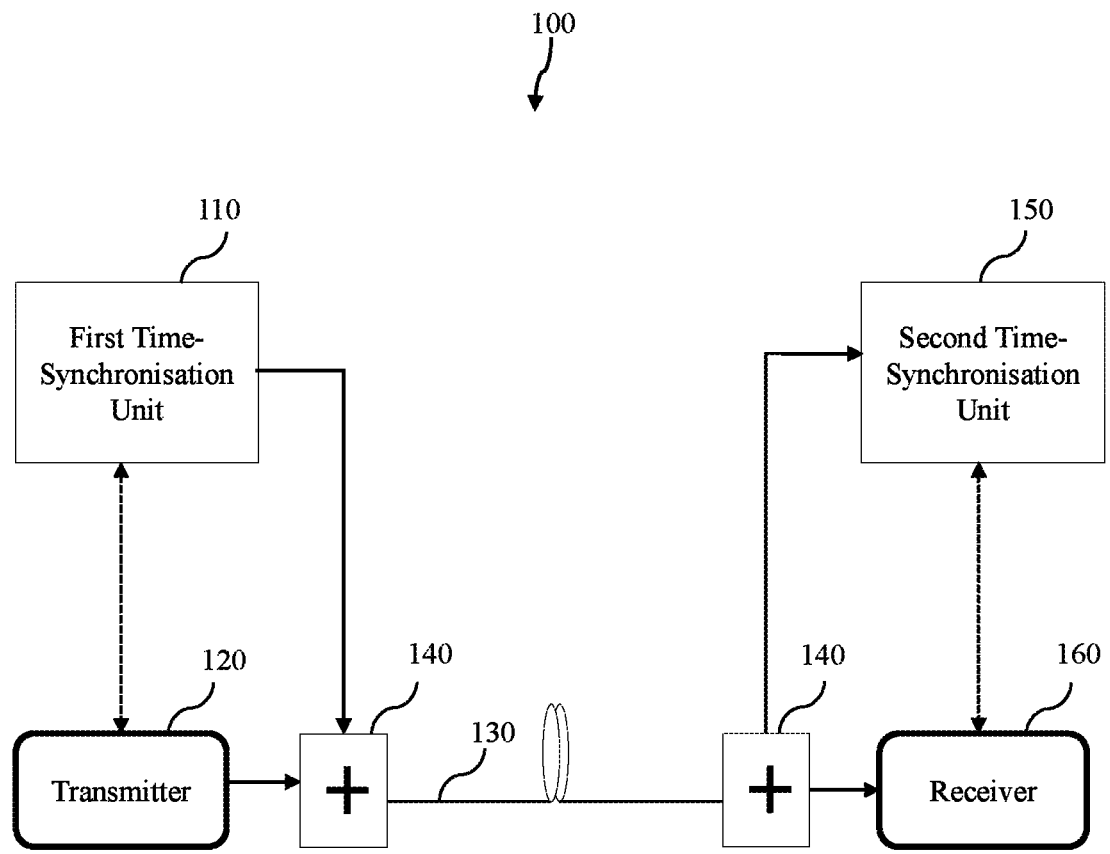
FIG. 1 is a block diagram of a system for transmitting time information and quantum states on an optical medium in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment". "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for transmitting time information and quantum states on an optical medium. The system includes a first time-synchronisation unit coupled to a transmitter. The first time-synchronisation unit is configured to transmit each information in a corresponding plurality of time slots through an optical channel, wherein each information includes timing information and a plurality of quantum states. The system also includes a second time-synchronisation unit operatively coupled to a receiver through the optical channel. The second time-synchronisation unit is configured to receive each transmitted information sequentially in the corresponding plurality of time slots. The second time-synchronisation unit is also configured to compare each timing information received in the corresponding plurality of time slots with timing information of a preceding hold over time-slot of the plurality of time slots. The second time-synchronisation unit is also configured to determine a time drift encountered at the receiver based on a compared result. The second time-synchronisation unit is also configured to synchronise phase and frequency of the information based on minimization of determined time drift.

FIG. 1 is a block diagram of a system 100 for transmitting time information and quantum states on an optical medium in accordance with an embodiment of the present disclosure. The system 100 includes a first time-synchronisation unit 110 coupled to a transmitter 120. The first synchronisation unit 110 is configured to transmit each information in a corresponding plurality of time slots through an optical channel 130, wherein each information includes timing information and a plurality of quantum states. As used herein, the term 'information' is defined as units of information which is transmitted between a source and a destination point through a transmission medium. Also, the term 'time-slot' is defined as an iteration within which each information is transmitted from the sender to the receiver.

Similarly, the term 'optical channel' is defined as the transmission medium through which the information is transmitted via an optical medium at a single wavelength with a certain bandwidth. In one embodiment, the optical medium may be an optical fibre. As used herein, the term 'quantum state' is defined as a set of an isolated quantum system which provides a probability distribution for a value of each observable entity. In one embodiment, the information in the corresponding plurality of timeslots may be transmitted in at least two predefined time intervals of the corresponding plurality of time slots, wherein the at least two predefined time intervals may include a first predefined time-interval for transmitting the timing information and a second predefined time-interval for transmitting the plurality of quantum states. For example, the first predefined time-interval may include 100 milliseconds time interval of a 1 second time slot from the plurality of corresponding time slots. The second predefined time-interval may include 900 milliseconds time intervals of a 1 second time slot from the plurality of corresponding time slots.

In a specific embodiment, the system 100 also includes at least two optical switches 140, wherein the at least two optical switches 140 are configured to calibrate selection of the first predefined time-interval and the second time-interval from at least two predefined time-intervals of the corresponding plurality of time slots. In such embodiment, the first predefined time-interval from the at least two predefined intervals may be selected for transmission of the timing information and the second predefined time-interval from the at least two predefined intervals may be selected for the transmission of the plurality of quantum states.

The system 100 also includes a second time-synchronisation unit 150 operatively coupled to a receiver 160 through the optical channel 130. The second time-synchronisation unit 150 is configured to receive each transmitted information sequentially in the corresponding plurality of time slots. In one embodiment, each transmitted information may be received at the receiver 160 in a recurrent manner in the corresponding plurality of time slots. In such embodiment, the plurality of quantum states of each information may be encrypted by using a quantum key distribution (QKD) method. In one embodiment, the transmitter 120 may include a clock, wherein the clock generates a clock signal to calibrate the each of the plurality of transmitted packets of information for subsequent decoding of a key, wherein the key is generated using the quantum key distribution (QKD) method on both the sides.

As used herein, the term 'QKD' method is defined as a secure communication method which implements a cryptographic protocol involving components of quantum mechanics and enables two parties such as a sender and a receiver to produce a shared random secret key for encrypting and decrypting messages. In some embodiment, the plurality of quantum states of the each of the plurality of packets of the information may be transmitted through a plurality of quantum key distribution (QKD) protocols. In such embodiment, the plurality of QKD protocols may include at least one of a BB84 protocol, a B92 protocol, a DPS protocol, a RRDPS protocol, a COW protocol, an MDI protocol or a combination thereof.

The second time-synchronisation unit 150 is also configured to compare each timing information received in the corresponding plurality of timeslots with timing information of a preceding hold over time-slot of the plurality of time slots. The term 'hold over time slot' is defined as a time duration when the second time-synchronisation unit undergoes a holdover mode and generates the timing information at time 'T1' without any reception of the timing information 'T0' of a preceding state from the transmitter at all. The second time-synchronisation unit is also configured to determine a time drift encountered at the receiver based on a compared result. The time drift is generated based on a difference of time duration encountered at the receiver. The transmission of the timing information is continued until the difference of the time duration encountered at the receiver in each time slots from the corresponding plurality of time slots is reduced. The reduced difference of the time duration minimises the time delay and enables maximum transmission of the plurality of quantum states of each information.

The second time-synchronisation unit 150 is also configured to synchronise phase and frequency of the plurality of transmitted packets of the information based on minimization of determined time drift. In one embodiment, the second time-synchronisation unit 150 may synchronise the phase and the frequency of the plurality of transmitted packets of the information by using the optical channel with a single wavelength. The second time-synchronisation unit 150 synchronises the phase and frequency of the plurality of transmitted packets of the information so that the optical channel is utilized for the transmission once the transmitter and the receiver are completely synchronized. Also, in the QKD, pre and post of quantum transmission, classical processing of the plurality of transmitted packets of the information is done, so that the synchronization of the phase and the frequency of the plurality of transmitted packets may be carried out without affecting a rate of key generation.

Figure 2:
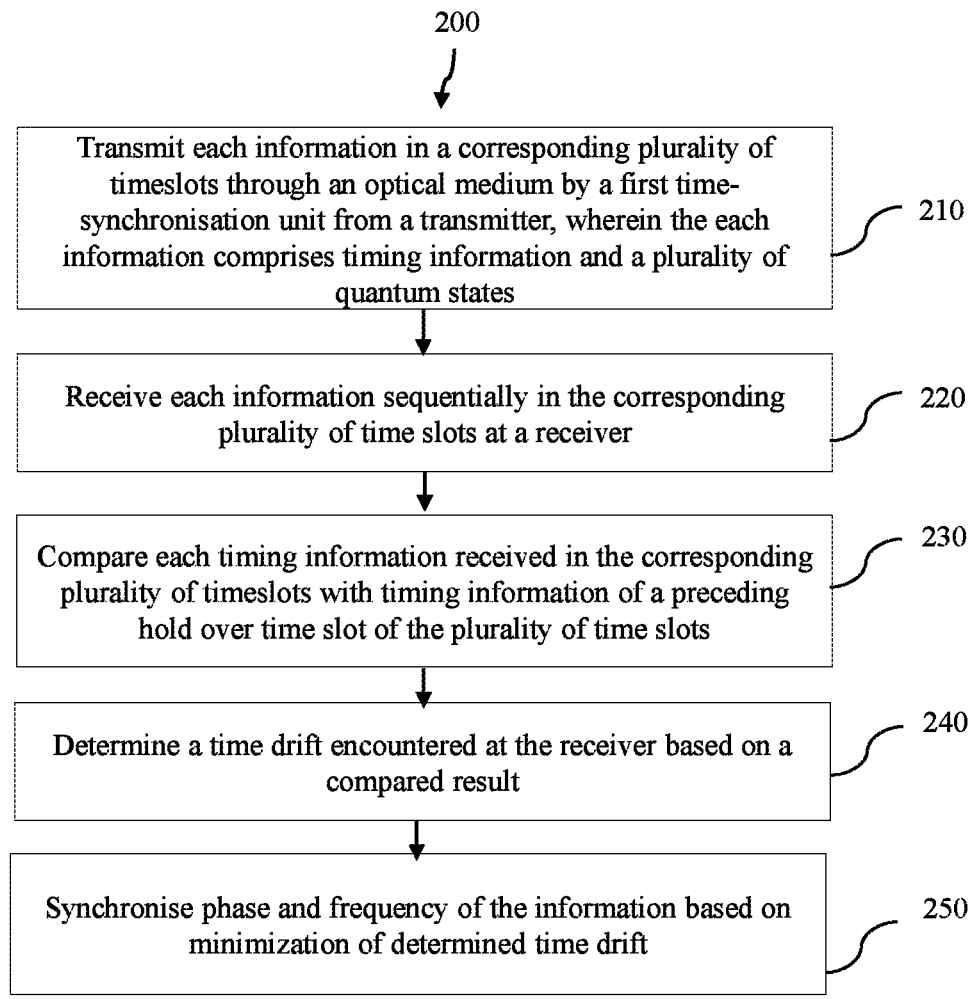
FIG. 2 is a flow chart representing the steps involved in a method for transmitting time information and quantum states on an optical medium in accordance with the embodiment of the present disclosure.

FIG. 2 is a flow chart representing the steps involved in a method 200 for channel multiplexing for timing synchronisation in quantum communication in accordance with the embodiment of the present disclosure. The method 200 includes transmitting each information in a corresponding plurality of timeslots through an optical channel by a first time-synchronisation unit coupled to a transmitter, wherein each information includes timing information and a plurality of quantum states in step 210. In one embodiment, transmitting each information in the corresponding plurality of timeslots through the optical channel by the first time-synchronisation unit may include transmitting each information in at least two predefined time-intervals of the corresponding plurality of time slots, wherein the at least two predefined time-intervals includes a first predefined time-interval for transmitting the timing information and a second predefined time-interval for transmitting the plurality of quantum states.

The method 200 also includes receiving each transmitted information sequentially in the corresponding plurality of time slots at a receiver in step 220. In one embodiment, receiving transmitted information sequentially in the corresponding plurality of time slots at the receiver may include receiving the transmitted information in a recurring manner in the corresponding plurality of time slots at the receiver. In some embodiment, receiving the information sequentially in the corresponding plurality of time slots may include receiving each of the plurality of quantum states of the each of the plurality of transmitted information by using a quantum key distribution (QKD) method. In such embodiment, encrypting the plurality of quantum states by using the QKD method may include encrypting the each of the quantum states through a plurality of quantum key distribution (QKD) protocols. In some embodiment, the plurality of QKD protocols may include at least one of a BB84 protocol, a B92 protocol, a DPS protocol, a RRDPS protocol, a COW protocol, an MDI protocol or a combination thereof.

The method 200 also includes comparing each timing information received in the corresponding plurality of timeslots with timing information of a preceding hold over time slot of the plurality of time slots in step 230. The method 200 also includes determining a time drift encountered at the receiver based on a compared result in step 240.

The method 200 also includes synchronising phase and frequency of the plurality of transmitted packets of the information based on minimization of determined time drift in step 250. In one embodiment, synchronising the phase and the frequency of the plurality of transmitted packets of the information may include synchronising the phase and the frequency of the plurality of transmitted packets by using the optical channel with a single wavelength.

Various embodiments of the present disclosure enable the transmission of the timing information and the plurality of quantum states into a single wavelength in a single optical channel on time sharing basis instead of using multiple separate optical channels of different wavelengths. The timing information and quantum state undergo same changes in parameters as they are sharing same medium and result in improved performance.

Moreover, the present disclosed system utilises the single secured optical channel which synchronises the transmission of information by reducing disturbances or noises and as a result generates a smaller number of errors.

Furthermore, the present disclosed system enables maximum utilization of the optical channel for quantum state transmission by improving the synchronisation process with each time slots by reducing the generated time delay encountered at the receiver.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A method for channel multiplexing for timing synchronisation in quantum communication, the method comprising
    transmitting, by a first time-synchronisation unit, each information comprising timing information and a plurality of quantum states together over a single wavelength in at least one of an optical fibre and free space optical medium, wherein the timing information and the plurality of quantum states are transmitted in at least two predefined time-intervals corresponding to a plurality of timeslots;
    receiving, by a second time-synchronisation unit, each of the transmitted timing information sequentially in the corresponding plurality of timeslots;
    comparing, by the second time-synchronisation unit, each timing information received in the corresponding plurality of time slots with timing information of a preceding hold over timeslot of the plurality of timeslots, wherein the hold over timeslot is a time duration when the second time-synchronisation unit undergoes a holdover mode and generates a timing information at time T1 without reception of a timing information T0 of a preceding state from a transmitter that is coupled to the first time-synchronisation unit;
    determining, by the second time-synchronisation unit, a time drift encountered at a receiver that is coupled to the second time-synchronisation unit based on a compared result, wherein the time drift is generated based on a difference of time duration encountered at the receiver; and
    synchronising, by the second time-synchronisation unit, phase and frequency of a plurality of transmitted packets of each information based on minimization of the determined time drift.

2. The method of claim 1, wherein the plurality of quantum states being generated from a first source and the timing information being generated from a second source, wherein the first source for generating the plurality of quantum states and the second source for generating the timing information are derived differently thereby assuring no leakage of information on quantum states from the timing information.

3. The method of claim 1, wherein the timing information and each of the plurality of quantum states undergo same changes in parameters, during the transmission, as they are sharing same medium.

4. The method of claim 1, wherein the at least two predefined time-intervals include a first predefined time-interval for transmitting the timing information and a second predefined time-interval for transmitting the plurality of quantum states.

5. The method of claim 1, wherein the second time-synchronisation unit synchronises the phase and frequency of the plurality of transmitted packets of each information using an optical channel with the single wavelength for the transmission of each information when the transmitter and the receiver are synchronized.

6. The method of claim 1, wherein the transmission of the timing information is continued until the difference of the time duration encountered at the receiver in each timeslots from the corresponding plurality of timeslots is reduced, and wherein the reduced difference of the time duration minimizes a time delay and enables maximum transmission of the plurality of quantum states of each information.

* * * * *